US006885516B2

(12) United States Patent
Tsuneyoshi et al.

(10) Patent No.: US 6,885,516 B2
(45) Date of Patent: Apr. 26, 2005

(54) MAGNETIC RECORDING AND REPRODUCTION APPARATUS INCLUDING GEAR MECHANISM

(75) Inventors: Nobutaka Tsuneyoshi, Tama (JP); Naoki Tatsumi, Tama (JP); Koichi Shimoyama, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 133 days.

(21) Appl. No.: 10/452,604

(22) Filed: Jun. 2, 2003

(65) Prior Publication Data

US 2003/0235003 A1 Dec. 25, 2003

(30) Foreign Application Priority Data

Jun. 19, 2002 (JP) ........................................ 2002-178242

(51) Int. Cl.[7] .......................................... G11B 15/665
(52) U.S. Cl. ........................................ 360/85; 360/95
(58) Field of Search .............................. 360/84, 85, 95, 360/71, 130.2, 130.21, 130.22, 130.23; 242/332, 340, 346

(56) References Cited

U.S. PATENT DOCUMENTS 5,258,881 A * 11/1993 Maehara et al. .............. 360/85
5,469,309 A * 11/1995 Konishi et al. ................ 360/85

FOREIGN PATENT DOCUMENTS

| JP | 59002254 A | * | 1/1984 | ........... G11B/15/66 |
| JP | 01140454 A | * | 6/1989 | ......... G11B/15/665 |
| JP | 02009049 A | * | 1/1990 | ......... G11B/15/665 |
| JP | 02210654 A | * | 8/1990 | ......... G11B/15/665 |
| JP | 06068561 A | * | 3/1994 | ......... G11B/15/665 |
| JP | 07262660 A | * | 10/1995 | ......... G11B/15/665 |

* cited by examiner

Primary Examiner—William J. Klimowicz
(74) Attorney, Agent, or Firm—Ladas & Parry LLP

(57) ABSTRACT

A magnetic recording and reproduction apparatus includes a tape loading mechanism including a driving ring gear member, first and second ring gear members for shifting first and second tape guide posts, respectively, and first, second, and third gear members engaging the driving ring gear member and the first and second ring gear members, respectively. Each of the first through third gear members includes a gear part and a cam part in the same plane. The cam part of the first gear member has an arcuate shape. The cam part of the second gear member engages the cam part of the third gear member so as to transmit rotation during the operation of the tape loading mechanism, and is pressed against the circumferential surface of the arcuate cam part of the first gear member in a state where the operation of the tape loading mechanism is completed.

8 Claims, 25 Drawing Sheets

MAGNETIC RECORDING AND REPRODUCTION APPARATUS INCLUDING GEAR MECHANISM

BACKGROUND OF THE INVENTION

1. Field of the Invention

The present invention generally relates to magnetic recording and reproduction apparatuses, and more particularly to a magnetic recording and reproduction apparatus including a tape loading mechanism.

2. Description of the Related Art

FIG. 1 is an exploded view of a tape loading mechanism 10 of a conventional magnetic recording and reproduction apparatus. The tape loading mechanism 10 includes a driving ring gear member 11, an L ring gear member 20 having a tape guide pole 21, an R ring gear member 30 having a tape guide pole 31, and a gear mechanism 40. The driving ring gear member 11, the L ring gear member 20, and the R ring gear member 30 are superimposed and supported so as to be rotatable independent of one another. Referring to FIGS. 2A through 2C, the gear mechanism 40 includes a gear member 41 that engages the driving ring gear member 11 shown in FIG. 1, a first gear member 50 that engages the gear member 41, and a second gear member 60 that engages the first gear member 50. The first gear member 50 engages the L ring gear member 20, and the second gear member 60 engages the R ring gear member 30.

When the driving ring gear member 11 is rotated counterclockwise by a motor, the gear member 41 is rotated. The rotation of the gear member 41 is transmitted to the first gear member 50 and further to the second gear member 60. The rotation of the first gear member 50 is transmitted to the L ring gear member 20, so that the L ring gear member 20, together with the tape guide pole 21, is rotated clockwise. The rotation of the second gear member 60 is transmitted to the R ring gear member 30, so that the R ring gear member, together with the tape guide pole 31, is rotated counterclockwise. As a result, a magnetic tape is pulled out to be wound around a rotary drum, thereby terminating tape loading.

While the driving ring gear member 11 is rotated a predetermined angle, the rotation is transmitted to the gear member 41, so that the gear member 41 is rotated. When the driving ring gear member 11 is rotated more than the predetermined angle, the rotation is prevented from being transmitted, so that the gear member 41 remains in a stationary state. While the gear member 41 is rotated a predetermined angle, the rotation is transmitted to the first gear member 50, so that the first gear member 50 is rotated. When the gear member 41 is rotated more than the predetermined angle, the rotation is prevented from being transmitted, so that the first gear member 50 remains in a stationary state. The first and second gear members 50 and 60 are always engaged.

As shown in FIGS. 2A through 2C, the gear member 41 has a cam part 41a disposed on a gear part 41b. The first gear member 50 has a convex cam part 51a formed to project upward (as viewed in FIG. 2B) from a gear tooth $51b_{-1}$ of a gear part 51b. The gear part 41b engages the gear part 51b, and the cam part 41a and the cam part 51a are positioned at the same level.

When tape loading is terminated, the gear mechanism 40 enters the state shown in FIG. 3A. In this state, as shown enlarged in FIG. 3B, the cam part 41a of the gear member 41 comes into contact with the convex cam part 51a of the first gear member 50. A spring member (not shown in the drawings) exerts a turning force in the $A_1$ direction on the gear member 41 with the cam part 51a being pressed against the cam part 41a with a force $f_1$.

SUMMARY OF THE INVENTION

The demand for downsizing magnetic recording and reproduction apparatuses has brought about a demand that the gear mechanism 40 should have as thin a configuration as possible. In order to reduce the thickness of the gear mechanism 40, it is required to reduce the gear member 41 and the first gear member 50 in thickness.

The cam part 41a and the gear part 41b of the gear member 41 are disposed at different levels, and the cam part 51a and the gear part 51b of the first gear member 50 are also disposed at different levels. Under the condition where there is limitation on the thickness of the gear member 41 and the first gear member 50, the thickness (height) a of each of the cam parts 41a and 51a is limited to small values. Further, the cam part 51a is pressed against the cam part 41a with the force $f_1$. Therefore, there is a problem that the cam parts 41a and 51a are worn easily so as to shorten the useful life of the gear mechanism 40. There is another problem that the cam part 51a easily disengages the cam part 41a.

Accordingly, it is a general object of the present invention to provide a magnetic recording and reproduction apparatus in which the above-described disadvantages are eliminated.

A more specific object of the present invention is to provide a magnetic recording and reproduction apparatus including a gear mechanism having a longer useful life and increased reliability.

The above objects of the present invention are achieved by a magnetic recording and reproduction apparatus, including: a tape loading mechanism including: a driving ring gear member; first and second ring gear members for shifting first and second tape guide posts, respectively; and first, second, and third gear members, the first gear member being rotatable by rotation transmitted from the driving ring gear member, and including a first gear part and a first cam part in a first single plane, the first cam part having an arcuate shape, the second gear member being rotatable by rotation transmitted from the first gear member to rotate the first ring gear member, and including a second gear part and a second cam part in a second single plane, the third gear member being rotatable by rotation transmitted from the second gear member to rotate the second ring gear member, and including a third gear part and a third cam part in a third single plane, the third cam part being shaped so as to be engageable with the second cam part of the second gear member, the first, second, and third single planes forming substantially a single plane, wherein the second cam part engages the third cam part so as to transmit rotation during an operation of the tape loading mechanism, and is pressed against a circumferential surface of the first cam part in a state where the operation of the tape loading mechanism is completed.

According to the above-described magnetic recording and reproduction apparatus, the first gear member rotatable by rotation transmitted from the driving ring gear member includes a gear part and an arcuate cam part in the same plane. Further, the second gear member, which is rotated by rotation transmitted from the first gear member so as to rotate the first ring gear member, includes a gear part and a cam part in the same plane, and the third gear member, which is rotated by rotation transmitted from the second gear member so as to rotate the second ring gear member, includes a gear part and a cam part in the same plane, the cam part being shaped so as to be engageable with the cam part of the second gear member. Therefore, compared with the conventional configuration, in which the gear part and the cam part of the second gear member are disposed in different planes, the thickness of the cam part of the second gear member and the arcuate cam part of the first gear member against which the cam part of the second gear member is pressed may be increased. This may delay the development of frictional wear in the arcuate cam part of the first gear member and the cam part of the second gear member, so that the useful life of a gear mechanism incorporating such gear members can be extended. Further, the cam part of the second gear member does not disengage the arcuate cam part of the first gear member as easily as the conventional configuration, so that the reliability of the gear mechanism may be increased.

The above objects of the present invention are also achieved by a magnetic recording and reproduction apparatus provided with a tape loading mechanism, including: first, second, and third gear members engaging first, second, and third ring gear members, respectively, so that rotation of the first ring gear member is transmitted to the second and third ring gear members via rotation of the first, second, and third gear members, whereby a tape may be selectively loaded and unloaded, the first ring gear member being a driving gear member, wherein: each of the first, second, and third gear members includes a gear part and a cam part formed in a single plane, the cam part of the first gear member having an arcuate shape; and the cam part of the second gear member engages the cam part of the third gear member while loading or unloading the tape, and is pressed against a circumferential surface of the cam part of the first gear member when the tape is loaded.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 4:
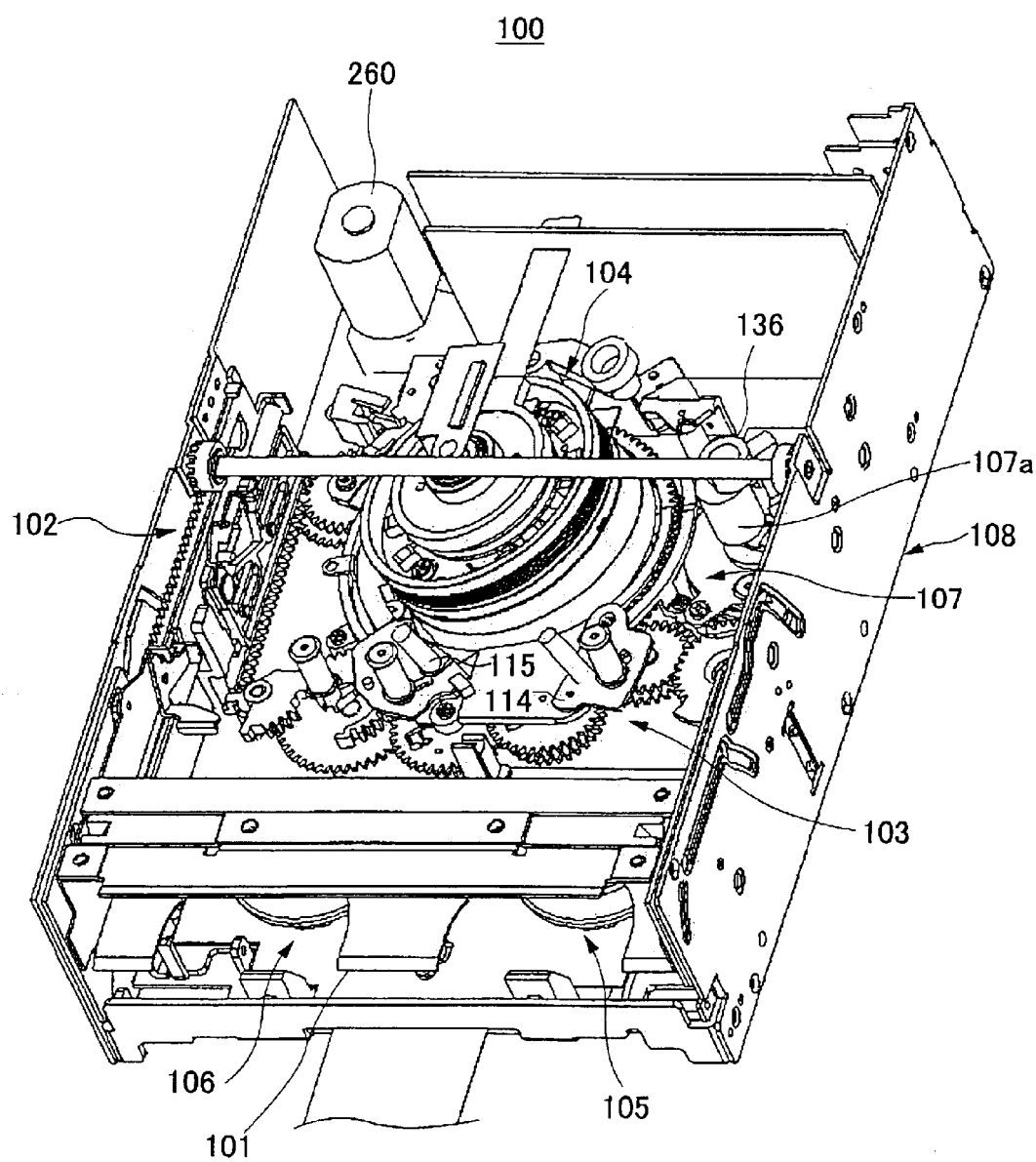
FIG. 4 is a perspective view of a magnetic recording and reproduction apparatus according to an embodiment of the present invention.
Figure 5:
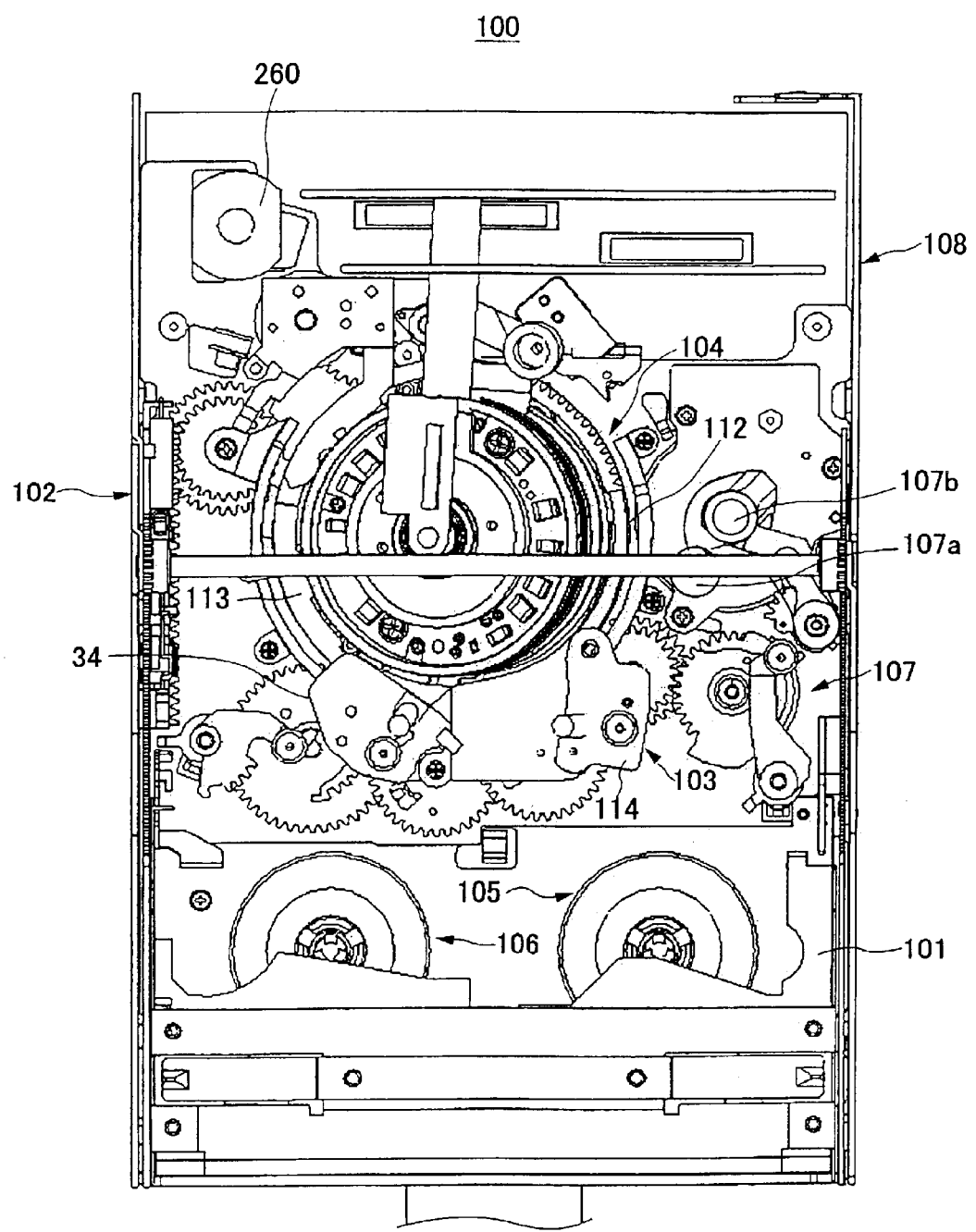
FIG. 5 is a plan view of the magnetic recording and reproduction apparatus according to the embodiment of the present invention.
Figure 6:
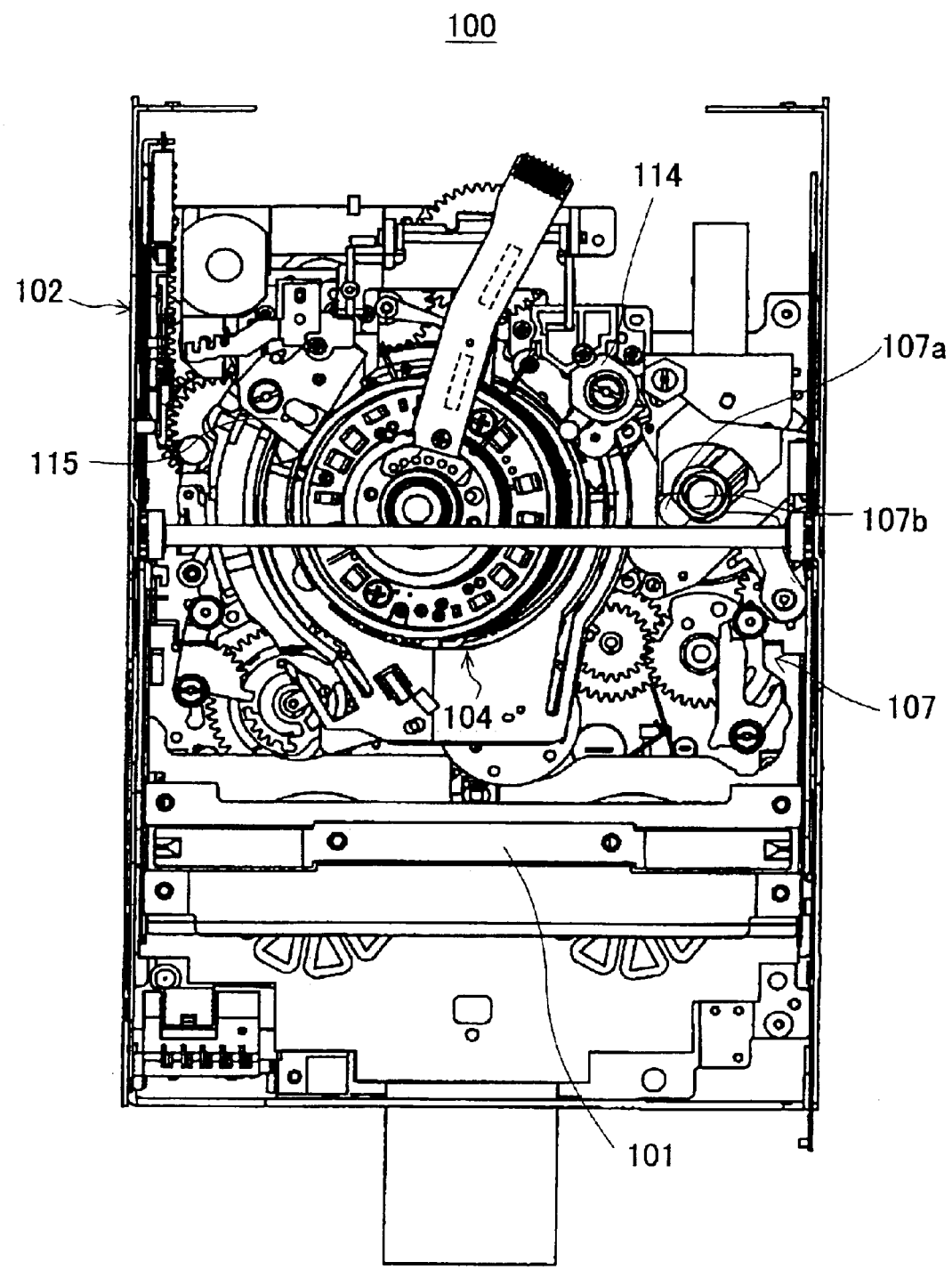
FIG. 6 is a plan view of the magnetic recording and reproduction apparatus according to the embodiment of the present invention, showing a state in which tape loading has been completed.

FIGS. 4 and 5 are diagrams showing the state of a magnetic recording and reproduction apparatus 100 according to the embodiment of the present invention in a stop mode. FIG. 6 is a diagram showing the state of the magnetic recording and reproduction apparatus 100 where tape loading is completed. The magnetic recording and reproduction apparatus 100 is a streamer employed, for instance, as external storage for a computer The magnetic recording and reproduction apparatus 100 includes: a holder 101 in which a tape cassette (not shown in the drawings) is inserted; a holder transporting mechanism 102 for transporting the holder 101 to a loading position; a tape loading mechanism 103 for pulling out a magnetic tape (not shown in the drawings) wound around the reels of the tape cassette; a rotary drum unit 104 around which the magnetic tape is wound a predetermined angle by the tape loading mechanism 103; reel driving mechanisms 105 and 106 for rotating the reels of the tape cassette; a pinch roller mechanism 107; and a main chassis 108 supporting these mechanisms.

A description will be given of the tape loading mechanism 103.

Figure 7:
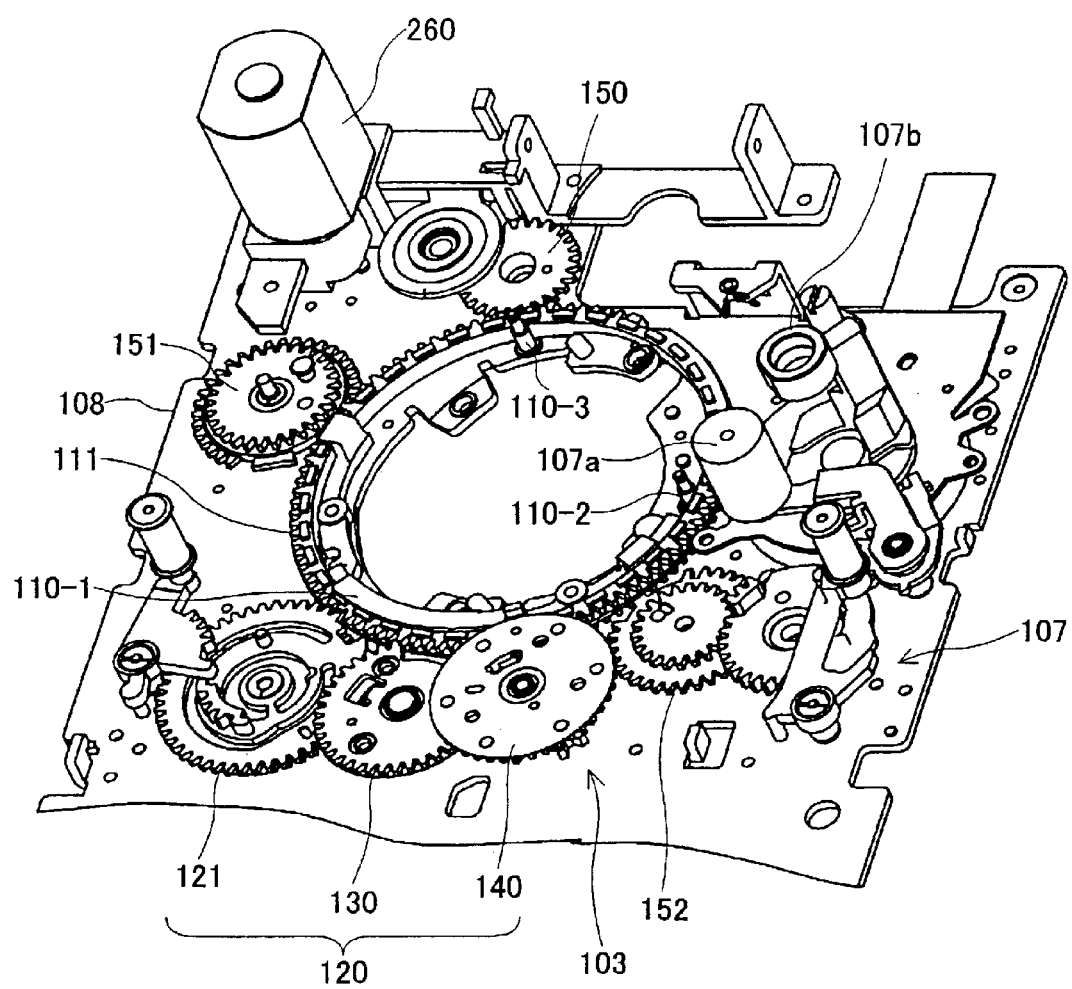
FIG. 7 is a perspective view of a tape loading mechanism and its peripheral support structure of the magnetic recording and reproduction apparatus according to the embodiment of the present invention.
Figure 8:
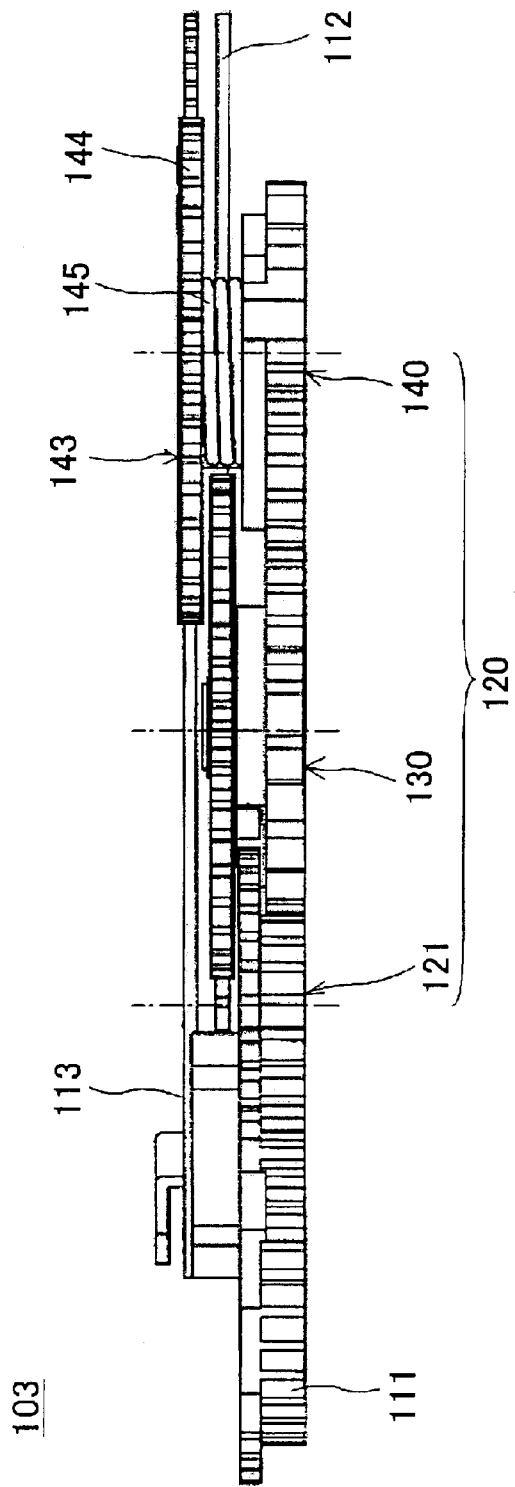
FIG. 8 is a front view of the tape loading mechanism of FIG. 7 according to the embodiment of the present invention.
Figure 9:
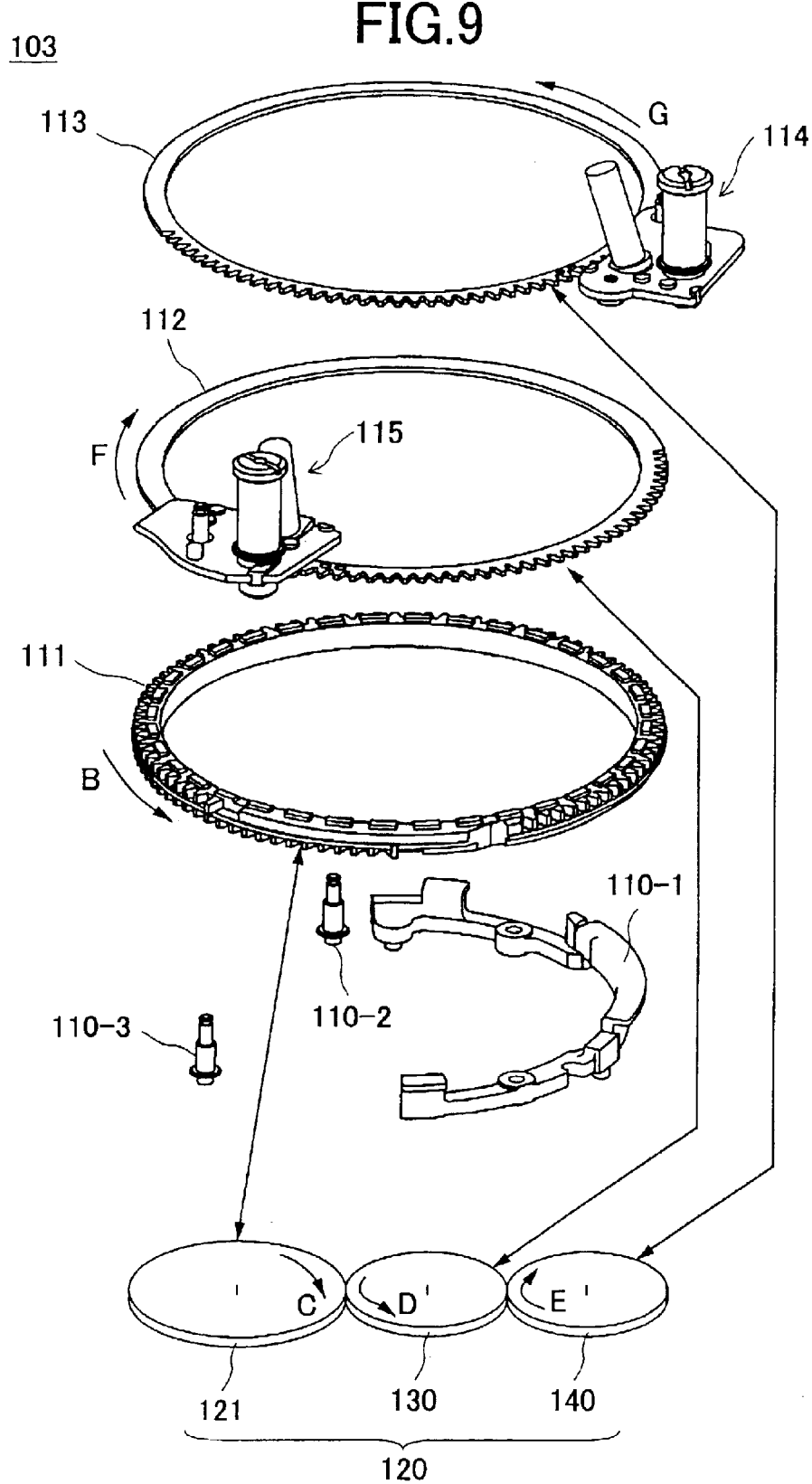
FIG. 9 is an exploded perspective view of the tape loading mechanism of FIG. 7 according to the embodiment of the present invention.

Referring to FIGS. 7 through 9, a ring guide member 110-1 and guide shafts 110-2 and 110-3 are fixed to the center of the main chassis 108. A driving ring gear member 111, an L ring gear member 112, and an R ring gear member 113 are superimposed on and supported by the ring guide member 110-1 and the guide shafts 110-2 and 110-3 so as to be rotatable independent of one another. A tape guide post unit 114 is attached to the R ring gear member 113, and a tape guide post unit 115 is attached to the L ring gear member 112.

A gear mechanism 120 is provided on the main chassis 108. The gear mechanism 120 includes a gear member 121 engaging the driving ring gear member 111, a first gear assembly 130 engaging the gear member 121, and a second gear assembly 140 engaging the first gear assembly 130. The first gear assembly 130 engages the L ring gear member 112, and the second gear assembly 140 engages the R ring gear member 113.

In addition to the gear assembly 120, a gear member 150, an intermittent gear member 151, and an intermittent gear member 152 are disposed around the driving ring gear member 111 (FIG. 7).

When a motor 260 is started, its rotation is transmitted through the gear member 150 to the driving ring gear member 111 so that the driving ring gear member 111 is rotated counterclockwise (in the B direction in FIG. 9). During the transmission, the rotation is decelerated. The rotation of the driving ring gear member 111 is transmitted to the intermittent gear member 151, the gear member 121, and the intermittent gear member 152 according to predetermined timing, so that the intermittent gear member 151, the gear member 121, and the intermittent gear member 152 are intermittently rotated. Rotating the intermittent gear member 151 causes the holder transporting mechanism 102 to operate to load the cassette tape. The gear member 121 is rotated in the C direction (FIG. 9). When the gear member 121 is rotated in the C direction, the first gear assembly 130 is rotated in the D direction (FIG. 9), so that the L ring gear member 112 is rotated in the F direction (FIG. 9) through the first gear assembly 130. Simultaneously, the second gear assembly 140 is rotated in the E direction (FIG. 9), so that the R ring gear member 112 is rotated in the G direction (FIG. 9) through the second gear assembly 140. As a result, the tape guide post units 115 and 114 are shifted as shown in FIG. 6 so as to pull out the magnetic tape from the tape cassette, and later-described torsion coil springs 135 and 145 (see FIGS. 12B and 12C) are twisted so as to fix the tape guide post units 115 and 114 to their respective final positions. Thus, the magnetic tape is loaded, wound over an angular range of approximately 220° around the rotary drum unit 104. Rotating the intermittent gear member 152 causes the pinch roller mechanism 107 to operate so that a pinch roller 107a presses the magnetic tape against a capstan 107b, thereby pinching the magnetic tape. The magnetic tape is driven, pinched and held by the pinch roller 107a and the capstan 107b, so as to run back and forth along the rotary drum unit 104 so that information may be recorded on the magnetic tape.

Next, a description will be given of the gear mechanism 120.

Figure 10A:
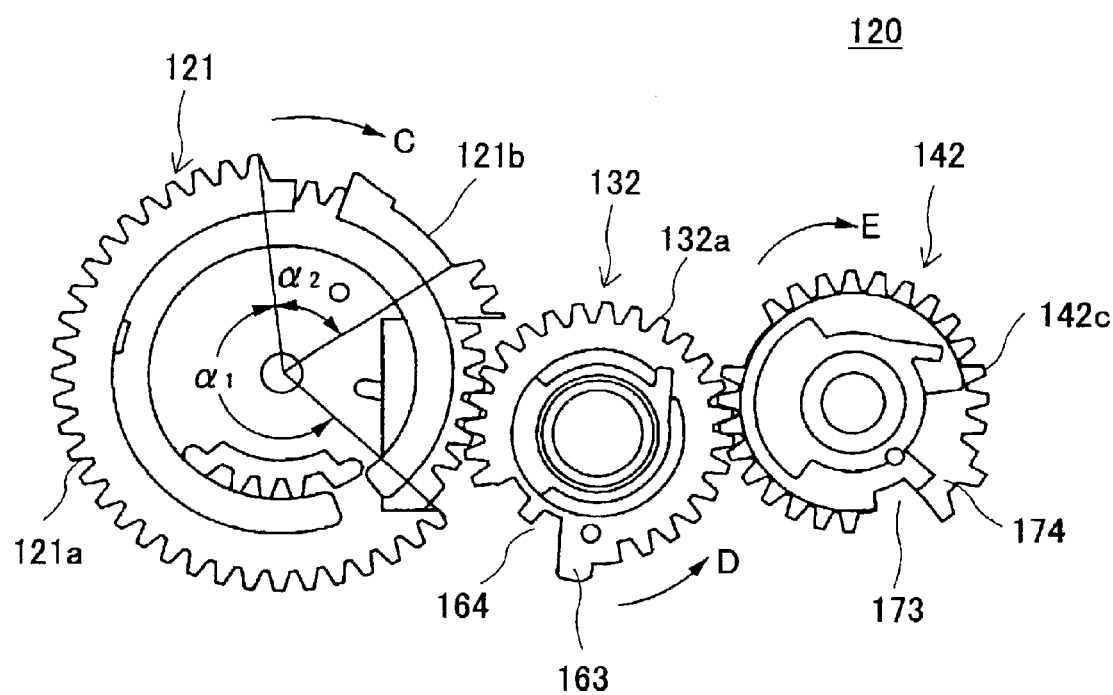
FIGS. 10A through 10C are a top plan view, a front view, and a bottom plan view, respectively, of a gear mechanism of the magnetic recording and reproduction apparatus according to the embodiment of the present invention.
Figure 10B:
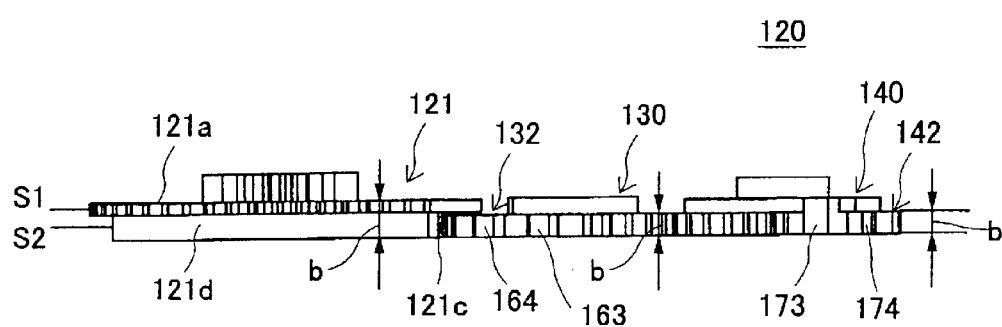
Figure 10C:
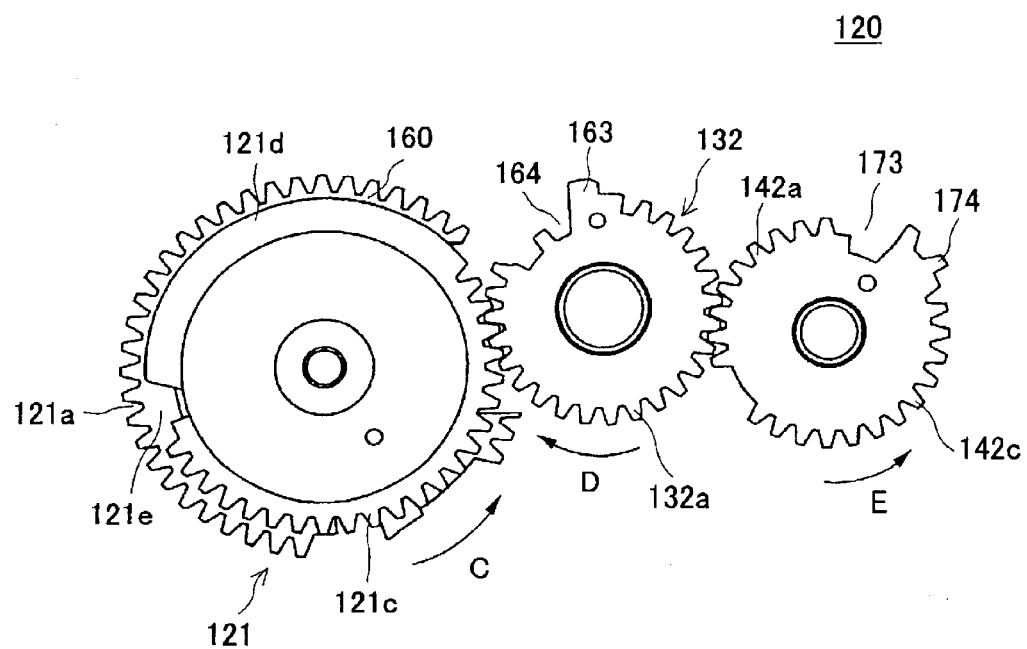
Figure 11:
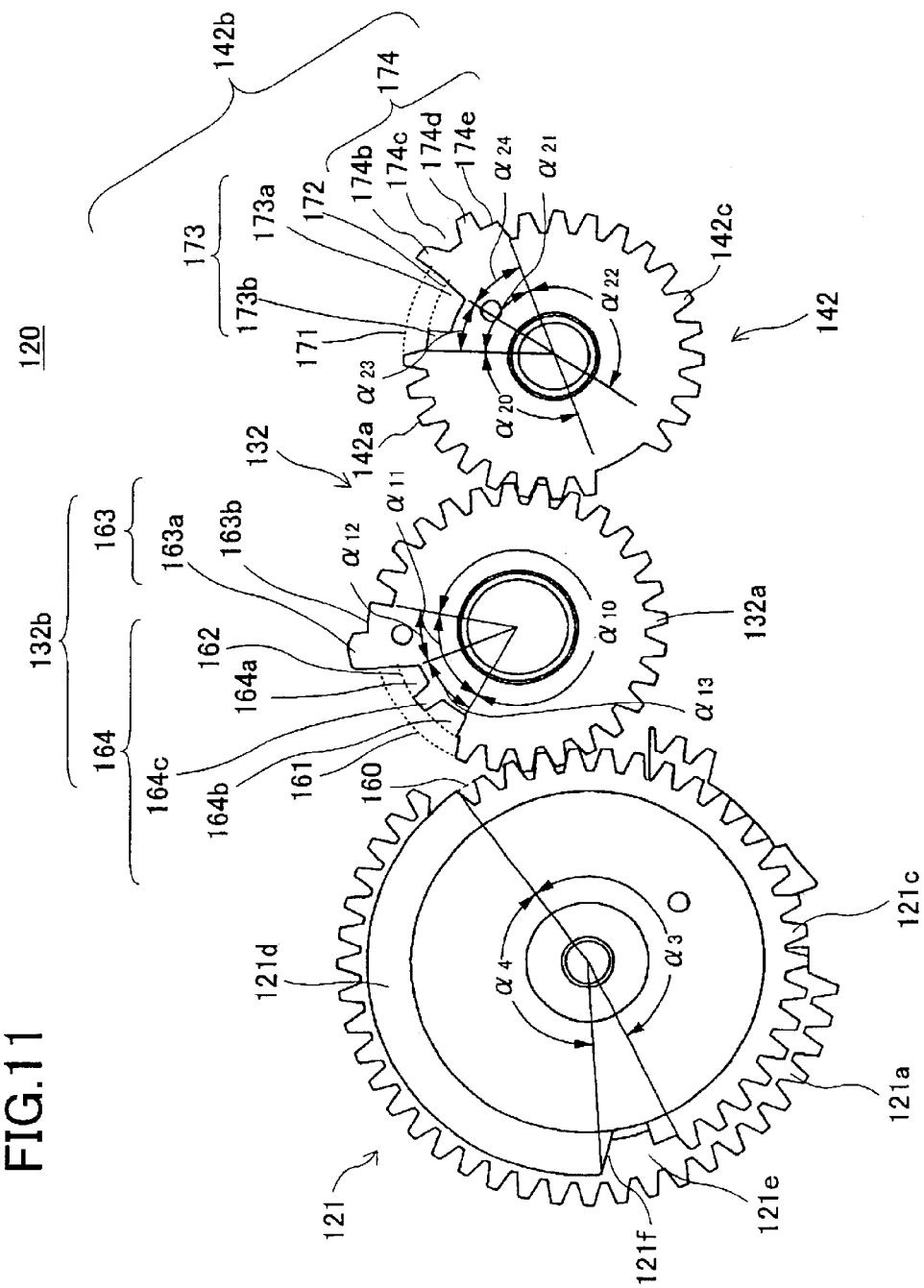
FIG. 11 is an enlarged bottom plan view of the gear mechanism according to the embodiment of the present invention.
Figure 12A:
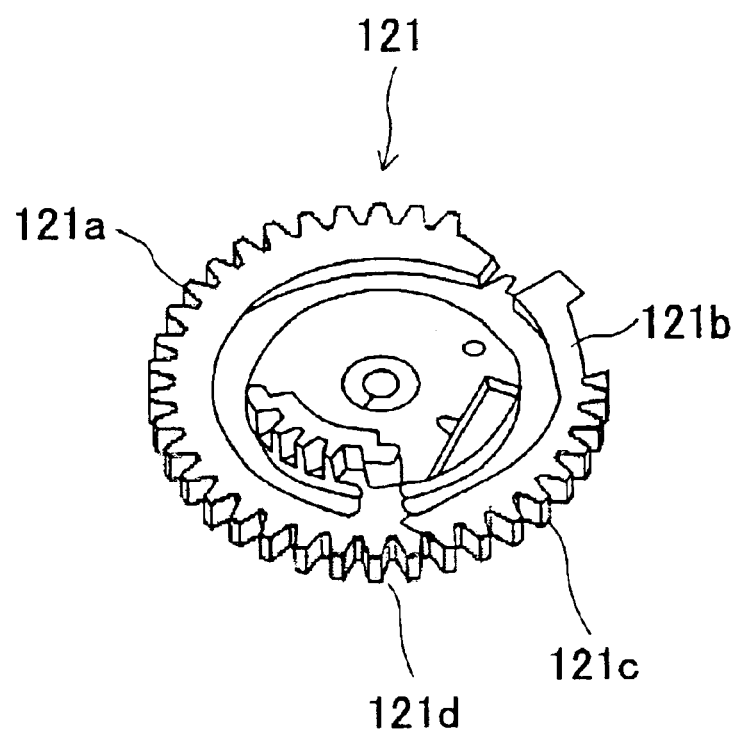
FIGS. 12A through 12C are a perspective view of a gear member, an exploded perspective view of a first gear assembly, and an exploded perspective view of a second gear assembly, respectively, of the gear mechanism according to the embodiment of the present invention.
Figure 12B:
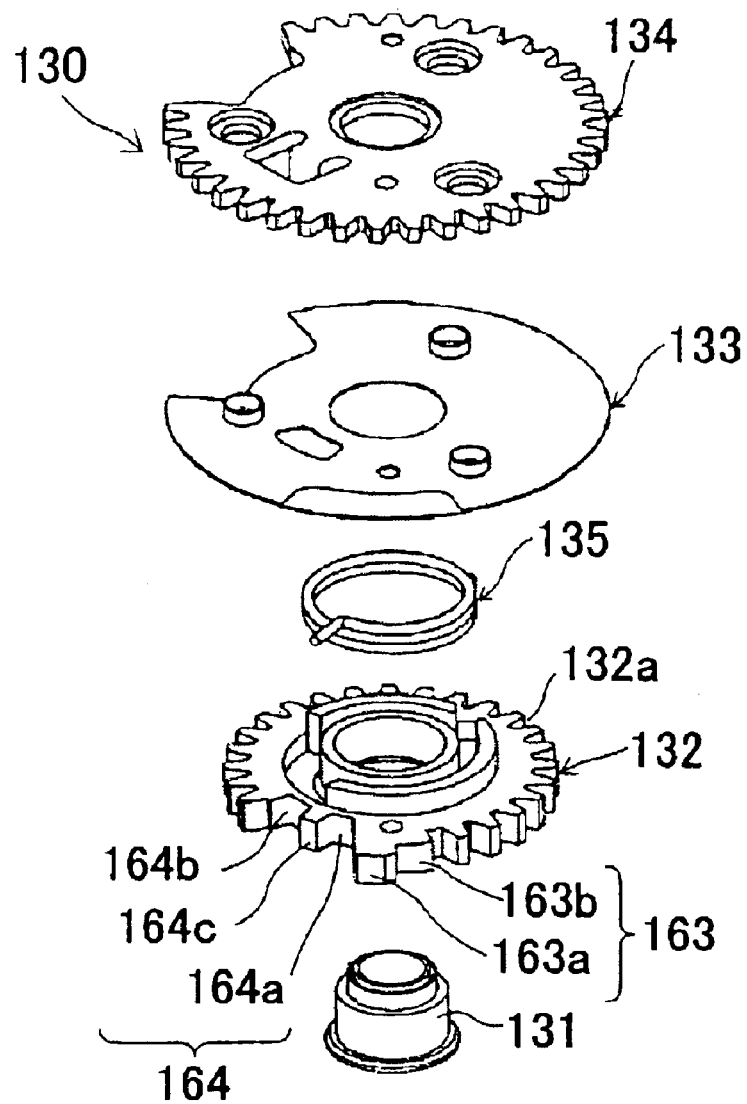
Figure 12C:
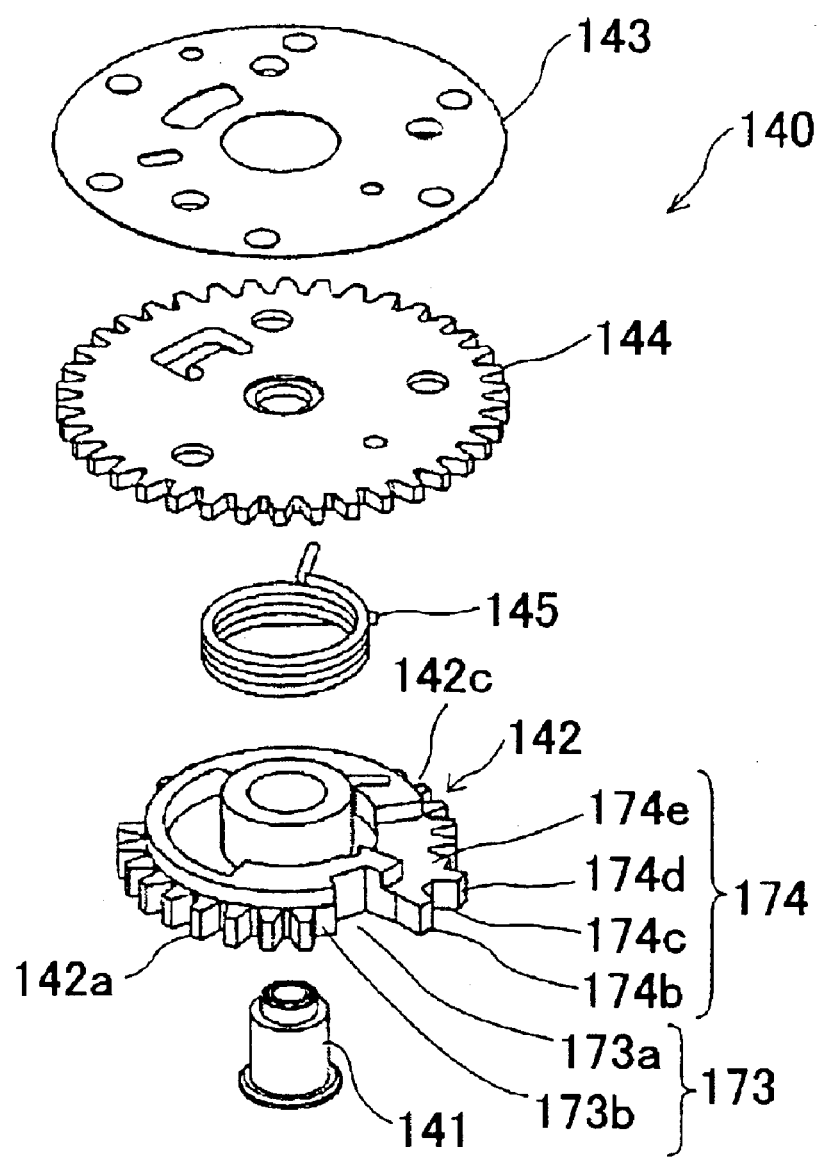

FIGS. 10A through 10C are a top plan view, a front view, and a bottom plan view, respectively, of the gear mechanism 120. FIG. 11 is an enlarged version of FIG. 10C. FIG. 12A is a perspective view of the gear member 121, FIG. 12B is an exploded perspective view of the first gear assembly 130, and FIG. 12C is an exploded perspective view of the second gear assembly 140. In FIGS. 10A and 10B, for convenience of description, the upper parts of the first and second gear assemblies 130 and 140 are omitted, and only the relevant parts thereof according to the present invention are shown.

The gear mechanism 120 is provided for operating the tape loading mechanism 103. Therefore, it is required that the rotation of the gear member 121 be intermittently transmitted to a later-described input-side gear member 132 of the first gear assembly 130. That is, there should be a state where the gear member 121 rotates while the input-side gear member 132 is stopped. Further, it is also necessary that the rotation of the input-side gear member 132 be constantly transmitted to a later-described input-side gear member 142 of the second gear assembly 140. Since the rotation of the gear member 121 should be transmitted intermittently to the input-side gear member 132, the input-side gear member 132 preferably includes a cam part of some kind. In the illustrated embodiment, the input-side gear member 132 includes a cam part 132b (FIG. 11), which is disposed in the same plane as a gear part 132a thereof. This prevents the gear part 132a from being formed circumferentially over an angular range of 360°. In order to have the rotation of the input-side gear member 132 transmitted constantly to the input-side gear member 142 in this situation, a special device should be provided to the input-side gear member 142. In consideration of the above-described situation, the gear mechanism 120 is configured as follows.

The gear member 121 includes a gear part 121a and a cam part 121b disposed in the same plane $S_1$ and a gear part 121c and an arcuate cam part 121d disposed in the same plane $S_2$ below (in FIG. 10B) the plane $S_1$. As shown in FIG. 10A, the gear part 121a is formed over an angular range of α1 and the cam part 121b is formed over an angular range of α2. As shown in FIG. 11, the gear part 121c is formed over an angular range of α3 and the arcuate cam part 121d is formed over an angular range of α4. The gear part 121a and the cam part 121b work with the driving ring gear member 111. The gear part 121c and the arcuate cam part 121d work with the first gear assembly 130. Since the gear part 121c and the arcuate cam part 121d are positioned in the same plane $S_2$, the gear part 121c and the arcuate cam part 121d each have a thickness b (FIG. 10B), which is approximately twice the thickness a of each of the cam parts 41a and 51a of the prior-art gear mechanism 40 shown in FIG. 2B. The arcuate cam part 121d is shaped so as to extend along a tip circle 160 (FIGS. 10C and 11) of the gear part 121c.

Further, the gear member 121 includes a concave cam part 121e (FIGS. 10C and 11) formed between the gear part 121c and the arcuate cam part 121d. The concave cam part 121e is shaped so as to correspond to a later-described first cam part 163 of the cam part 132b of the input-side gear member 132. An end face 121f (FIG. 11) of the arcuate cam part 121d opposes the concave cam part 121e.

Referring to FIG. 12B, the first gear assembly 130 includes an output-side gear member 134, a bushing 131 caulked thereto, the input-side gear member 132, a flange member 133, and the aforementioned torsion coil spring 135. The input-side gear member 132 and the flange member 133 are superimposed to be fitted with the bushing 131. The torsion coil spring 135 is provided between the input-side gear member 132 and the output-side gear member 134. The input-side gear member 132 has substantially the same thickness b (FIG. 10B) as the gear part 121c.

As shown in FIG. 11, the input-side gear member 132 includes the gear part 132a formed over an angular range of α10 and the cam part 132b formed over an angular range of α11. The gear part 132a and the cam part 132b are disposed in a single plane that is substantially the same as the plane $S_2$ (see FIG. 10B). Reference numeral 161 denotes the tip circle of the gear part 132a and reference numeral 162 denotes the root circle of the gear part 132a. The cam part 132b includes the projecting first cam part 163 formed over an angular range of α12 and a concave second cam part 164 formed over an angular range of α13. The first and second cam parts 163 and 164 are adjacent to each other. The first cam part 163 includes a convex cam part 163a projecting from the tip circle 161 and a cam part 163b formed along the tip circle 161. The second cam part 164 includes a recess formed between the gear part 132a and the first cam part 163. The second cam part 164 further includes a concave cam part 164a, a convex cam part 164c, and a concave cam part 164b that are formed at the bottom of the recess. The concave cam parts 164a and 164b are formed inside the root circle 162. The crest part of the convex cam part 164c is formed along the root circle 162.

Referring to FIG. 12C, the second gear assembly 140 includes an output-side gear member 144, a bushing 141 caulked thereto, the input-side gear member 142, a flange member 143, and the aforementioned torsion coil spring 145. The input-side gear member 142 and the flange member 143 are fitted with the bushing 141. The torsion coil spring 145 is provided between the input-side gear member 142 and the output-side gear member 144. The input-side gear member 142 has substantially the same thickness b (FIG. 10B) as the gear part 132a.

As shown in FIG. 11, the input-side gear member 142 includes a gear part 142a, a cam part 142b, and a gear part 142c formed successively-over an angular range of α20, an angular range of α21, and an angular range of α22, respectively. The gear part 142a, the cam part 142b, and the gear part 142c are disposed in a single plane that is substantially the same as the plane $S_2$ (see FIG. 10B) Reference numeral 171 denotes the tip circle of the gear parts 142a and 142c, and reference numeral 172 denotes the root circle of the gear parts 142a and 142c. The cam part 142b includes a concave first cam part 173 formed over an angular range of α23 and a projecting second cam part 174 formed over an angular range of α24. The first and second cam parts 173 and 174 are adjacent to each other. The first cam part 173 is shaped so as to correspond to the first cam part 163 of the cam part 132b of the input-side gear member 132. The first cam part 173 includes a recess formed between the gear part 142a and the second cam part 174. The first cam part 173 further includes a concave cam part 173a formed inside the root circle 172 and a cam part 173b formed along the root circle 172. The second cam part 174 is shaped so as to correspond to the second cam part 164 of the cam part 132b of the input-side gear member 132. The second cam part 174 includes a convex cam part 174b, a concave cam part 174c, a convex cam part 174d, and a concave cam part 174e that are formed circumferentially in sequence. The convex cam parts 174b and 174d project outward from the tip circle 171. The bottoms of the concave cam parts 174c and 174e are formed along the tip circle 171.

The input-side gear member 132 of the first gear assembly 130 engages the intermittent gear member 121, and the input-side gear member 142 of the second gear assembly 140 engages the input-side gear member 132.

Referring again to FIGS. 10A through 10C, the rotation of the gear member 121 of 360° or less in the C direction is transmitted to the input-side gear member 132 and the rotation of the input-side gear member 132 of 360° or less in the D direction is transmitted to the input-side gear member 142, so that the input-side gear member 142 rotates 360° or less in the E direction. Next, a description will be given of this operation. For convenience of the following description, the gear mechanism 120 is viewed from its bottom side.

Initially, the gear mechanism 120 is in the state shown in FIG. 11 (or FIGS. 10A through 10C). The gear part 121c of the gear member 121 engages the gear part 132a of the input-side gear member 132 of the first gear assembly 130. The gear part 132a of the input-side gear member 132 engages the gear part 142a of the input-side gear member 142 of the second gear assembly 140.

Figure 16A:
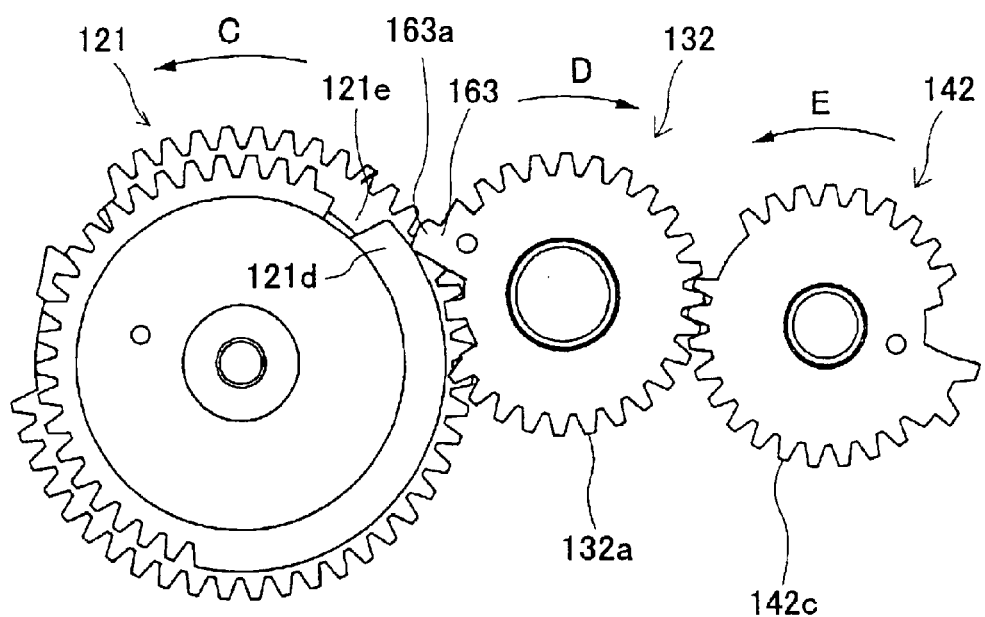
FIGS. 16A and 16B are diagrams showing a final state of rotation transmission of the gear mechanism according to the embodiment of the present invention.

The rotation of the driving ring gear member 111 causes the gear member 121 to rotate approximately 270° in the C direction to the position shown in FIG. 16A via the states shown in FIGS. 13A through 15B, and is stopped at the position shown in FIG. 16A.

[Transmission of Rotation from the Gear Member 121 to the Input-Side Gear Member 132]

As shown in FIGS. 13A through 14B, the gear part 121c of the gear member 121 and the gear part 132a of the input-side gear member 132 engage each other so that the rotation of the gear member 121 is transmitted to the input-side gear member 132. At the final stage, as shown in FIGS. 15A through 16A, the concave cam part 121e of the gear member 121 and the first cam part 163 of the cam part 132b of the input-side gear member 132 engage each other, and then, the end face 121f of the arcuate cam part 121d of the gear member 121 pushes the first cam part 163 out of the concave cam part 121e. The rotation is thus transmitted.

[Transmission of Rotation from the Input-Side Gear Member 132 to the Input-Side Gear Member 142]

Figure 13A:
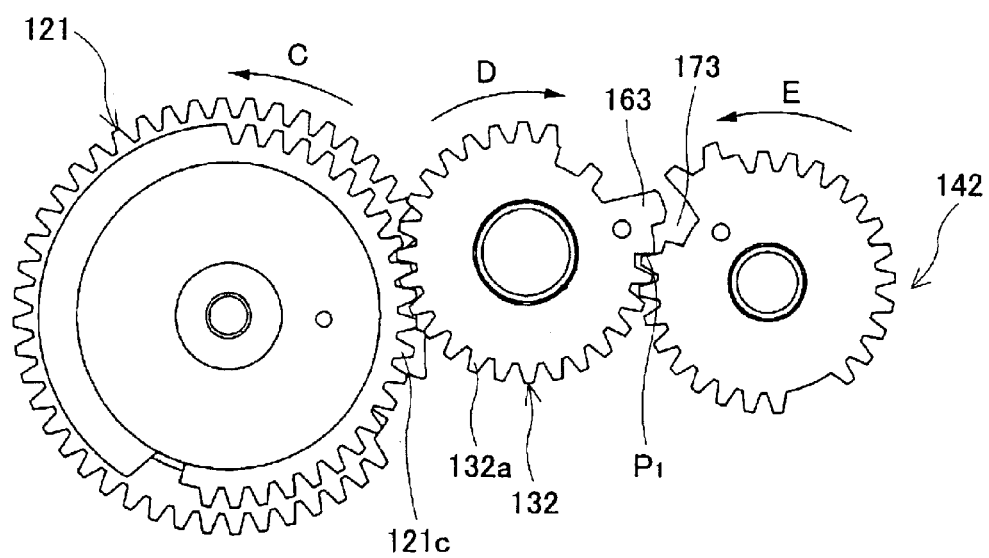
FIGS. 13A through 15B are diagrams showing a series of rotation transmitting movements of the gear mechanism according to the embodiment of the present invention.
Figure 13B:
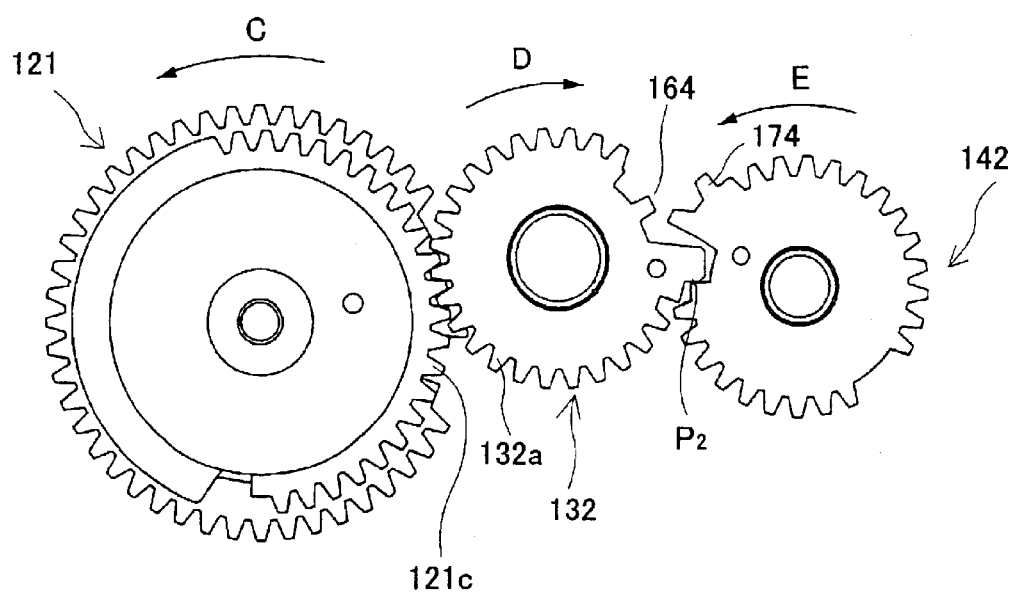
Figure 14A:
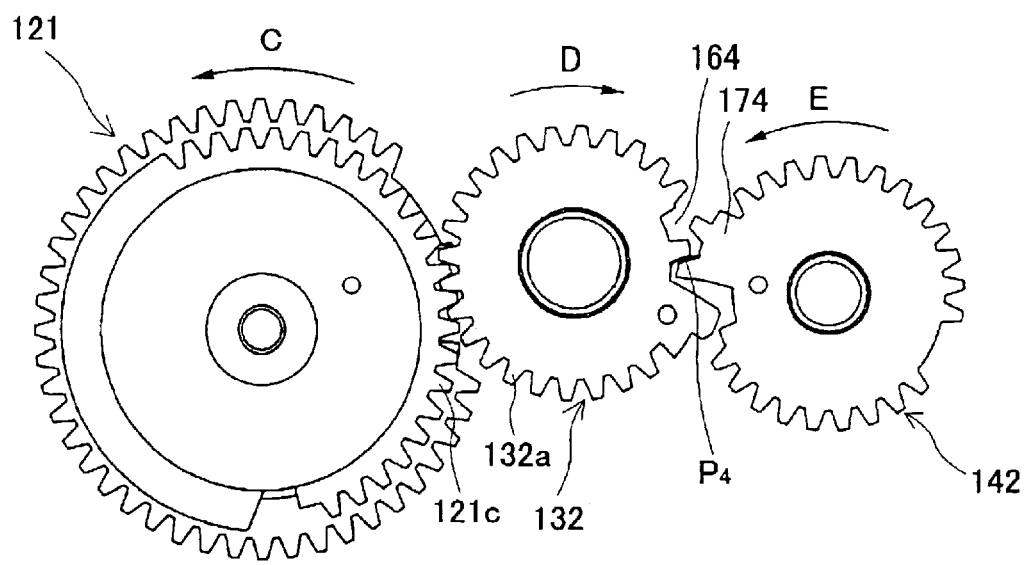
Figure 14B:
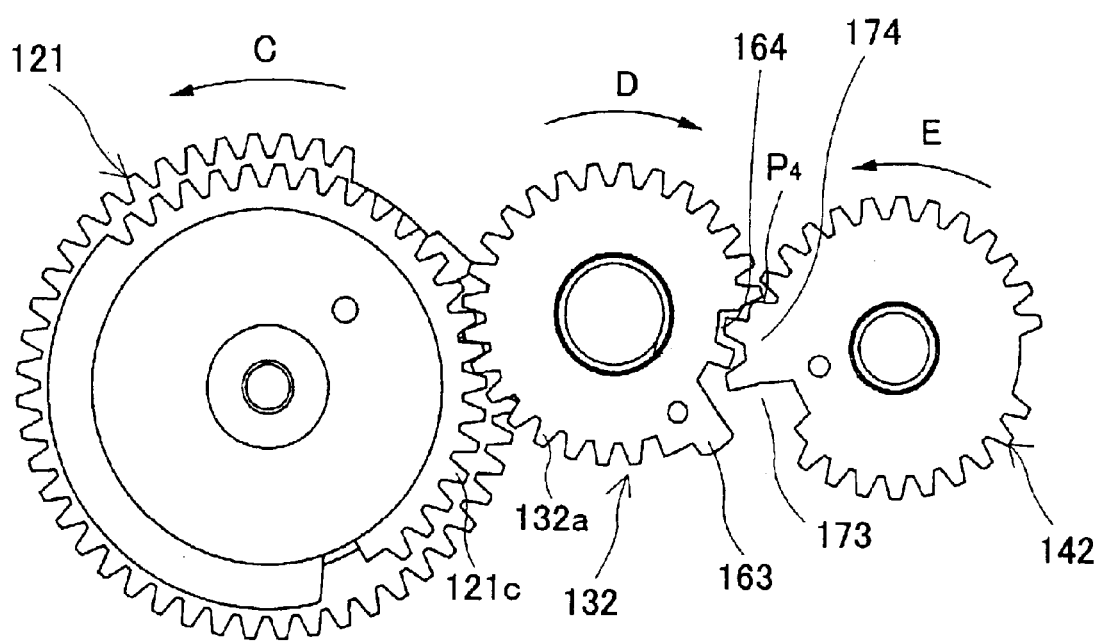
Figure 15A:
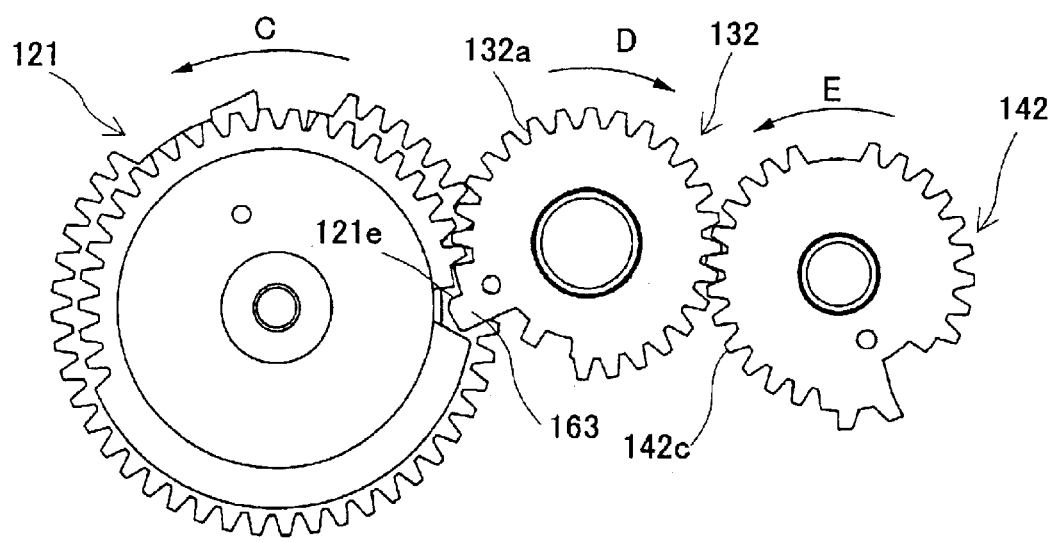
Figure 15B:
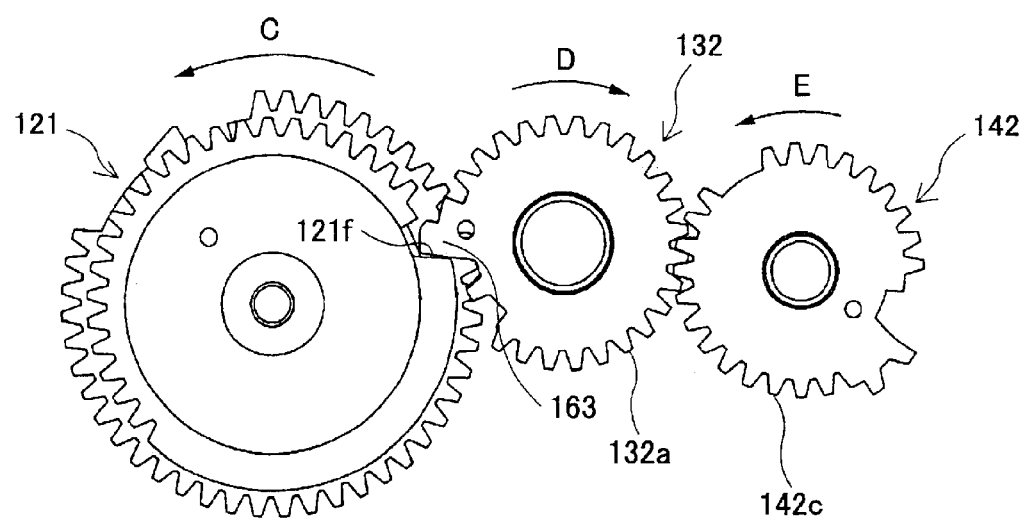

Initially, the gear part 132a of the input-side gear member 132 and the gear part 142a of the input-side gear member 142 engage each other so that the rotation of the input-side gear member 132 is transmitted to the input-side gear member 142. Next, as shown in FIGS. 13A and 13B, the first cam part 163 engages the first cam part 173 so as to be fitted in and pulled out of the first cam part 173 so that the transmission of rotation from the input-side gear member 132 to the input-side gear member 142 continues. Next, as shown in FIGS. 14A and 14B, the second cam part 174 engages the second cam part 164 so as to be fitted in and pulled out of the second cam part 164 so that the transmission of rotation continues. Thereafter, as shown in FIGS. 15A through 16A, the gear part 132a and the gear part 142c engage each other so that the rotation of the input-side gear member 132 is transmitted to the input-side gear member 142.

Following is a description of the transmission of rotation by the first cam part 163 and the first cam part 173 and of the transmission of rotation by the second cam part 164 and the second cam part 174. The rotation of the input-side gear member 132 is transmitted first by the first cam part 163 pushing the first cam part 173 first at the point $P_1$ shown in FIG. 13A and next at the point $P_2$ shown in FIG. 13B and then by the second cam part 164 pushing the second cam part 174 first at the point $P_3$ shown in FIG. 14A and next at the point $P_4$ shown in FIG. 14B.

The formation of the projecting convex cam part 163a and the concave cam part 173a (see FIG. 11) ensures the formation of (or the engagement at) point $P_2$ (FIG. 13B). Further, the formation of the projecting convex cam part 174b and the concave cam part 164a (see FIG. 11) ensures the formation of (or the engagement at) point $P_3$ (FIG. 14A). Accordingly, the stable transmission of rotation using the first cam parts 163 and 173 and the second cam parts 164 and 174, which have special tooth shapes, is ensured.

Figure 16B:
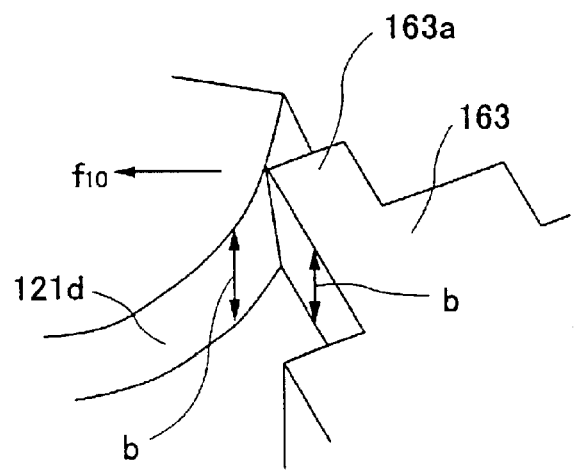

At the final stage of the transmission of rotation, the torsion coil springs 135 and 145 are twisted, so that the rotational force in the reverse direction of D is generated in the input-side gear member 132. As a result, as shown in FIG. 16B, the convex cam part 163a of the first cam part 163 is pressed against the arcuate cam part 121d of the gear member 121 with a force $f_{10}$.

Figure 1:
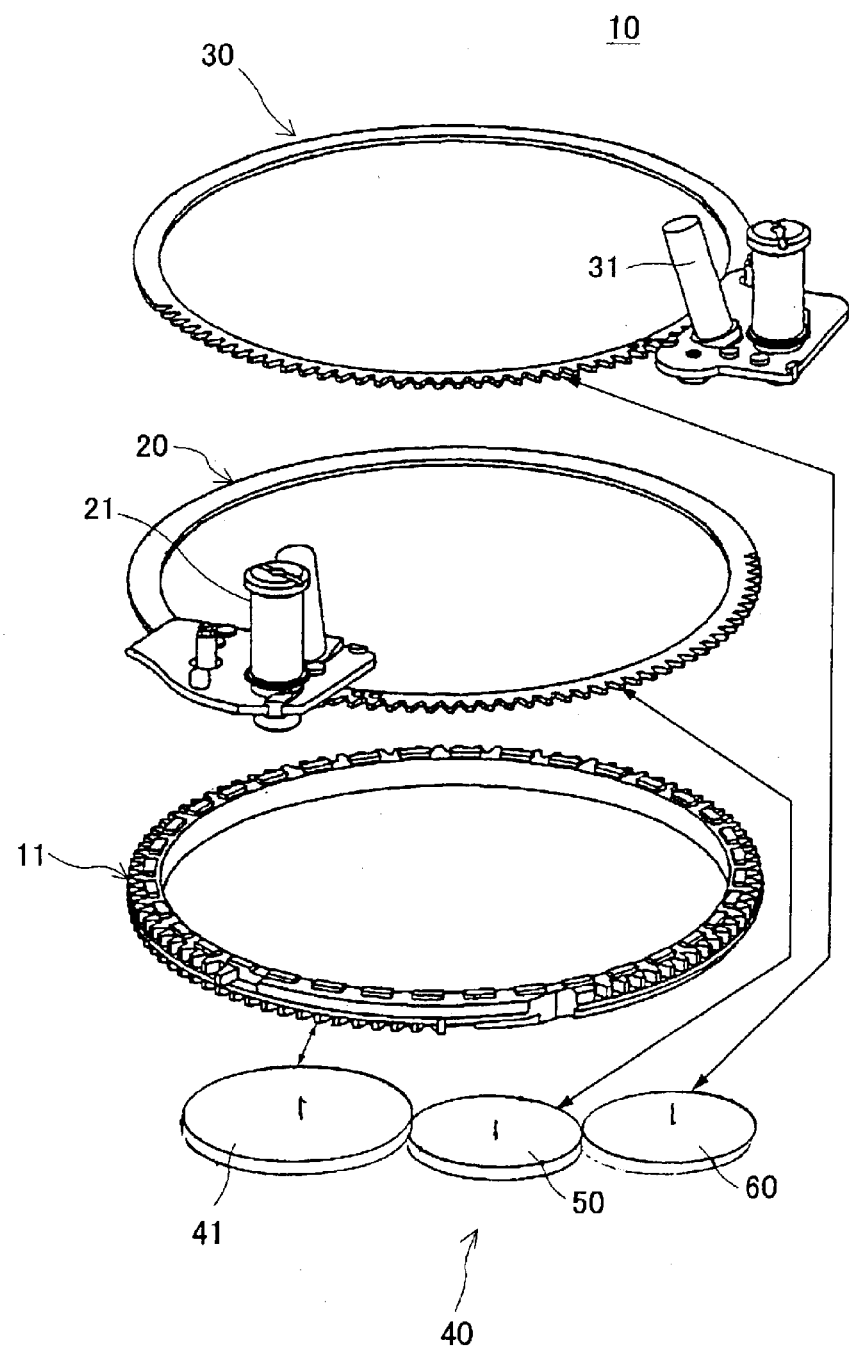
FIG. 1 is an exploded view of a tape loading mechanism of a conventional magnetic recording and reproduction apparatus.
Figure 2A:
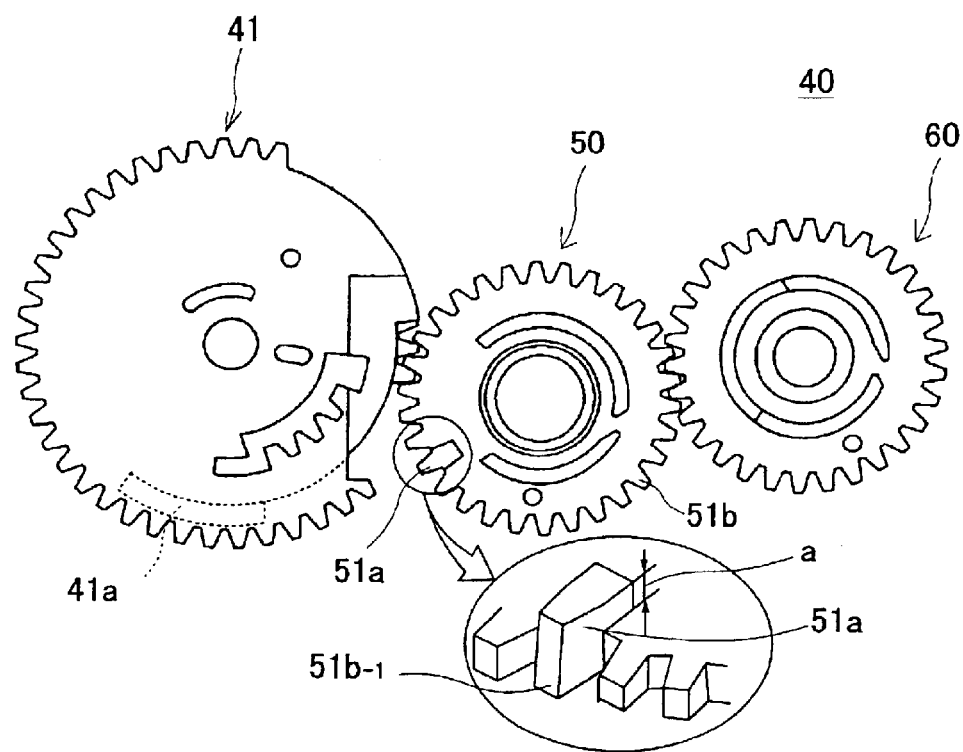
FIGS. 2A through 2C are a top plan view, a front view, and a bottom plan view, respectively, of a gear mechanism of the tape loading mechanism of FIG. 1.
Figure 2B:
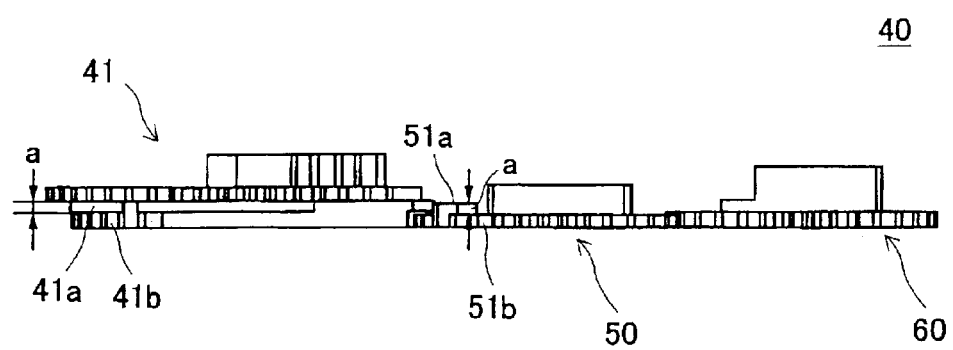
Figure 2C:
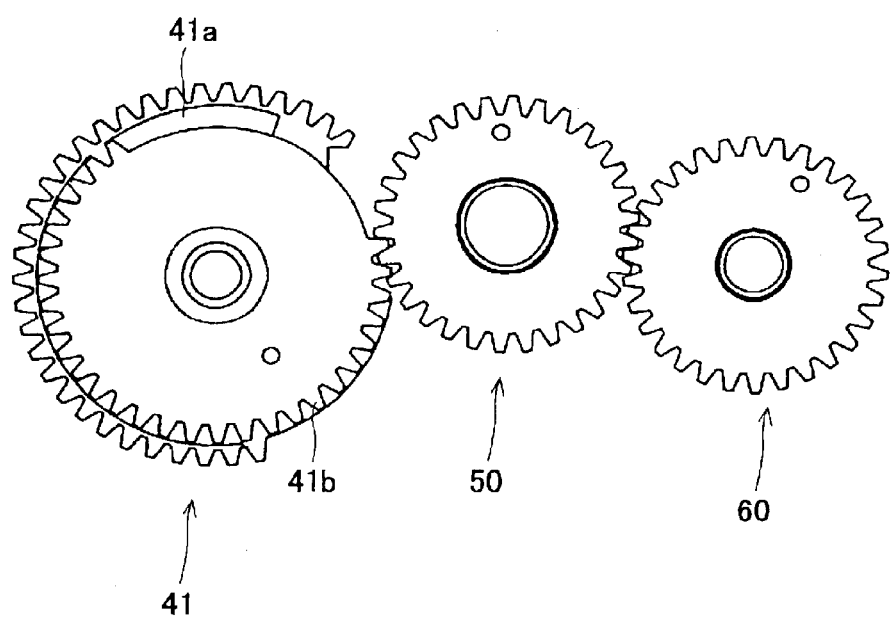
Figure 3A:
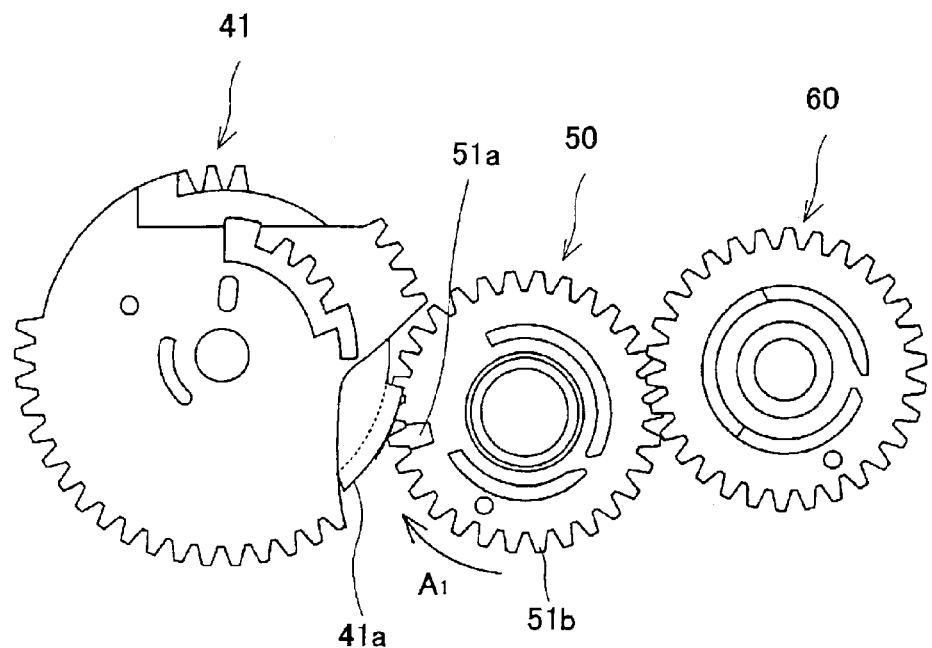
FIGS. 3A and 3B are diagrams showing a state of the gear mechanism after tape loading has been completed.
Figure 3B:
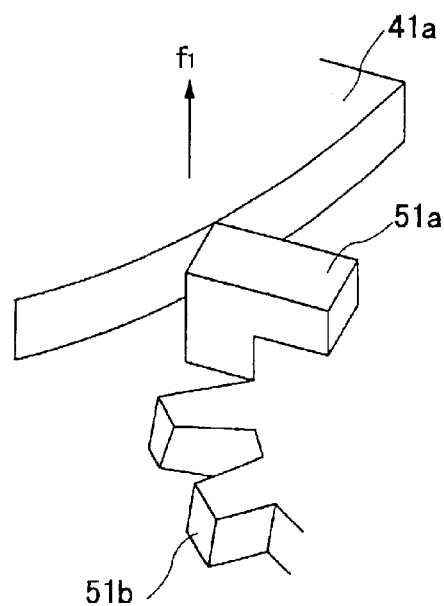

The thickness b of the convex cam part 163a and the arcuate cam part 121d is larger than the thickness a of the cam parts 41a and 51a of the prior-art gear mechanism 40 shown in FIG. 2B. Therefore, the convex cam part 163a and the arcuate cam part 121d are less subject to frictional wear than conventionally, so that the gear mechanisms 120 may enjoy a longer useful life than conventionally. Further, the convex cam part 163a disengages the arcuate cam part 121d less easily than conventionally.

In the case of tape unloading, the gear member 121 is rotated in the reverse direction of arrow C from the state shown in FIG. 16A, and the rotation of the gear member 121 and the rotation of the input-side gear member 132 are transmitted to the input-side gear member 132 and the input-side gear member 142, respectively, in the reverse order of the above-described sequence in the case of tape loading through the states shown in FIGS. 15B, 15A, 14B, 14A, 13B, and 13A.

The transmission of rotation from the input-side gear member 132 to the input-side gear member 142 using the first cam parts 163 and 173 and the second cam parts 164 and 174 is performed first by the second cam part 164 engaging and fitting with the second cam part 174 and next by the first cam part 163 fitting in and engaging the first cam part 173.

The present invention is not limited to the specifically disclosed embodiment, and variations and modifications may be made without departing from the scope of the present invention.

The present application is based on Japanese priority application No. 2002-178242, filed on Jun. 19, 2002, the entire contents of which are hereby incorporated by reference.

What is claimed is:

1. A magnetic recording and reproduction apparatus, comprising:

a tape loading mechanism including: a driving ring gear member; first and second ring gear members for shifting first and second tape guide posts, respectively; and first, second, and third gear members, the first gear member being rotatable by rotation transmitted from the driving ring gear member, and including a first gear part and a first cam part in a first single plane, the first cam part having an arcuate shape, the second gear member being rotatable by rotation transmitted from the first gear member to rotate the first ring gear member, and including a second gear part and a second cam part in a second single plane, the third gear member being rotatable by rotation transmitted from the second gear member to rotate the second ring gear member, and including a third gear part and a third cam part in a third single plane, the third cam part being shaped so as to be engageable with the second cam part of the second gear member, the first, second, and third single planes forming substantially a single plane, wherein the second cam part engages the third cam part so as to transmit rotation during an operation of the tape loading mechanism, and is pressed against a circumferential surface of the first cam part in a state where the operation of the tape loading mechanism is completed.

2. The magnetic recording and reproduction apparatus as claimed in claim 1, wherein the driving ring gear member and the first and second ring gear members are superimposed on and supported by a guide member so as to be rotatable independent of one another.

3. The magnetic recording and reproduction apparatus as claimed in claim 1, wherein:

the second cam part includes a projecting cam part and a concave cam part formed adjacent to each other; and the third cam part includes a concave cam part and a projecting cam part formed adjacent to each other.

4. The magnetic recording and reproduction apparatus as claimed in claim 3, wherein:

the projecting cam part of the second cam part includes a convex cam portion projecting from a tip circle of the second gear part;

the concave cam part of the second cam part includes a concave cam portion formed inside a root circle of the second gear part;

the concave cam part of the third cam part includes a concave cam portion formed inside a root circle of the third gear part; and the projecting cam part of the third cam part includes a convex cam portion projecting from a tip circle of the third gear part.

5. The magnetic recording and reproduction apparatus as claimed in claim 4, wherein:

the concave cam portion of the concave cam part of the second cam part includes a plurality of concave portions; and the convex cam portion of the projecting cam part of the third cam part includes a plurality of convex portions.

6. The magnetic recording and reproduction apparatus as claimed in claim 3, wherein:

the second and third cam parts engage each other so that the projecting cam part of the second cam part engages the concave cam part of the third cam part and the concave cam part of the second cam part engages the projecting cam part of the third cam part.

7. A magnetic recording and reproduction apparatus provided with a tape loading mechanism, comprising:

first, second, and third gear members engaging first, second, and third ring gear members, respectively, so that rotation of the first ring gear member is transmitted to the second and third ring gear members via rotation of the first, second, and third gear members, whereby a tape may be selectively loaded and unloaded, the first ring gear member being a driving gear member, wherein:

each of the first, second, and third gear members includes a gear part and a cam part formed in a single plane, the cam part of the first gear member having an arcuate shape; and the cam part of the second gear member engages the cam part of the third gear member while loading or unloading the tape, and is pressed against a circumferential surface of the cam part of the first gear member when the tape is loaded.

8. The magnetic recording and reproduction apparatus as claimed in claim 7, wherein each of the cam parts of the second and third gear members includes a projecting part and a concave part shaped so that the projecting part and the concave part of the cam part of the second gear member engage the concave part and the projecting part, respectively, of the cam part of the third gear member while the tape is loaded or unloaded.

* * * * *